(12) United States Patent
Cook

(10) Patent No.: US 11,323,337 B2
(45) Date of Patent: May 3, 2022

(54) RESOURCE MEASUREMENT AND MANAGEMENT

(75) Inventor: Michael J. Cook, Flemington, NJ (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 13/245,897

(22) Filed: Sep. 27, 2011

(65) Prior Publication Data

US 2013/0080620 A1  Mar. 28, 2013

(51) Int. Cl.
| | |
|---|---|
| *G06F 15/173* | (2006.01) |
| *H04L 41/5025* | (2022.01) |
| *H04N 21/2543* | (2011.01) |
| *H04N 21/24* | (2011.01) |
| *G06Q 30/02* | (2012.01) |
| *H04N 21/647* | (2011.01) |
| *H04L 43/0882* | (2022.01) |
| *H04L 47/26* | (2022.01) |

(52) U.S. Cl.
CPC ......... *H04L 41/5025* (2013.01); *G06Q 30/02* (2013.01); *H04L 43/0882* (2013.01); *H04L 47/26* (2013.01); *H04N 21/2408* (2013.01); *H04N 21/2543* (2013.01); *H04N 21/64723* (2013.01)

(58) Field of Classification Search
CPC . H04L 41/5025; H04L 43/0882; H04L 47/26; H04N 21/2408; H04N 21/2543; H04N 21/64723
USPC ........................................................ 709/224
See application file for complete search history.

(56) References Cited

U.S. PATENT DOCUMENTS

| | | | |
|---|---|---|---|
| 5,361,394 A | 11/1994 | Shigihara | |
| 5,687,167 A | 11/1997 | Bertin et al. | |
| 5,761,191 A | 6/1998 | VanDervort et al. | |
| 5,872,588 A | 2/1999 | Aras et al. | |
| 5,926,476 A | 7/1999 | Ghaibeh | |
| 6,028,860 A | 2/2000 | Laubach et al. | |
| 6,148,081 A | 11/2000 | Szymanski et al. | |
| 6,331,987 B1 | 12/2001 | Beser | |
| 6,427,238 B1 | 7/2002 | Goodman et al. | |
| 6,502,135 B1 | 12/2002 | Munger et al. | |
| 6,594,246 B1 * | 7/2003 | Jorgensen | H04L 1/20 370/338 |
| 6,915,530 B1 | 7/2005 | Kauffman et al. | |
| 6,941,574 B1 | 9/2005 | Broadwin et al. | |
| 6,970,641 B1 | 11/2005 | Pierre et al. | |
| 7,017,175 B2 | 3/2006 | Alao et al. | |
| 7,027,461 B1 | 4/2006 | Bontempi | |
| 7,055,169 B2 | 5/2006 | Delpuch et al. | |
| 7,065,780 B2 | 6/2006 | Barbier et al. | |

(Continued)

*Primary Examiner* — Kevin T Bates
*Assistant Examiner* — Nazia Naoreen
(74) *Attorney, Agent, or Firm* — Banner & Witcoff, Ltd.

(57) ABSTRACT

Aspects of the disclosure relate to measuring and managing data traffic in one or more networks. In some embodiments, a monitor may measure the traffic at one or more locations within the network(s) or devices associated therewith to determine whether the traffic exceeds a threshold. When the traffic exceeds the threshold, one or more actions may be taken, such as issuing or transmitting a command or directive. The command or directive may advise a device or an application to throttle or reduce an input or stimulus responsible for generating the traffic. In some embodiments, a throttling may be effectuated to reduce the data traffic.

42 Claims, 6 Drawing Sheets

(56) References Cited

U.S. PATENT DOCUMENTS

| | | | |
|---|---|---|---|
| 7,231,455 B2 * | 6/2007 | Marejka | H04L 47/22 709/230 |
| 7,305,697 B2 | 12/2007 | Alao et al. | |
| 7,362,704 B2 | 4/2008 | Sisto et al. | |
| 7,426,185 B1 | 9/2008 | Musacchio et al. | |
| 7,433,953 B1 | 10/2008 | Kappler et al. | |
| 7,440,999 B2 * | 10/2008 | DeCenzo | H04N 7/165 709/203 |
| 7,468,945 B2 | 12/2008 | Enomoto et al. | |
| 7,650,379 B2 * | 1/2010 | Hart et al. | 709/203 |
| 7,876,696 B2 * | 1/2011 | Kotelba | H04L 1/0002 370/252 |
| 7,917,648 B2 | 3/2011 | Wu et al. | |
| 8,201,205 B2 * | 6/2012 | Boucher | H04L 12/2801 370/229 |
| 8,208,001 B2 * | 6/2012 | Tucker | H04N 7/15 348/14.08 |
| 8,213,301 B2 | 7/2012 | Park et al. | |
| 8,396,055 B2 * | 3/2013 | Patel et al. | 370/352 |
| 8,682,363 B1 | 3/2014 | Cardi et al. | |
| 8,843,652 B2 | 9/2014 | Balasubramanian | |
| 8,850,480 B2 * | 9/2014 | Chane | 725/24 |
| 8,914,839 B2 * | 12/2014 | Howe | H04N 21/44222 725/131 |
| 9,106,557 B2 | 8/2015 | Wolcott et al. | |
| 9,461,955 B1 | 10/2016 | Sherrets | |
| 9,635,421 B2 * | 4/2017 | Tidwell | H04N 21/23109 |
| 2002/0006111 A1 | 1/2002 | Akita et al. | |
| 2002/0126673 A1 | 9/2002 | Dagli et al. | |
| 2002/0142780 A1 | 10/2002 | Airy et al. | |
| 2002/0188732 A1 | 12/2002 | Buckman et al. | |
| 2003/0018745 A1 * | 1/2003 | McGowan | H04L 65/4076 709/217 |
| 2003/0210665 A1 | 11/2003 | Salmenkaita et al. | |
| 2004/0177087 A1 | 9/2004 | Wu et al. | |
| 2004/0257995 A1 | 12/2004 | Sandy et al. | |
| 2005/0047783 A1 | 3/2005 | Sisto et al. | |
| 2005/0076339 A1 | 4/2005 | Merril et al. | |
| 2005/0094558 A1 | 5/2005 | Lu | |
| 2005/0138674 A1 * | 6/2005 | Howard | H04N 21/8547 725/136 |
| 2005/0195968 A1 | 9/2005 | Park et al. | |
| 2005/0281235 A1 | 12/2005 | Beach et al. | |
| 2006/0053146 A1 | 3/2006 | Allhusen et al. | |
| 2006/0099956 A1 | 5/2006 | Harada et al. | |
| 2006/0120282 A1 | 6/2006 | Carlson et al. | |
| 2006/0129458 A1 * | 6/2006 | Maggio | G06Q 30/02 705/14.2 |
| 2006/0142040 A1 | 6/2006 | Jones | |
| 2006/0184664 A1 | 8/2006 | Jung | |
| 2006/0212917 A1 | 9/2006 | Boucher et al. | |
| 2006/0233108 A1 | 10/2006 | Krishnan | |
| 2007/0071026 A1 | 3/2007 | Rogers | |
| 2007/0091176 A1 | 4/2007 | Shih et al. | |
| 2007/0195789 A1 | 8/2007 | Yao | |
| 2007/0214248 A1 | 9/2007 | Ikeda et al. | |
| 2008/0075003 A1 | 3/2008 | Lee et al. | |
| 2008/0089240 A1 | 4/2008 | Toomey et al. | |
| 2008/0144586 A1 | 6/2008 | Kneckt et al. | |
| 2008/0191816 A1 | 8/2008 | Balachandran et al. | |
| 2008/0310452 A1 * | 12/2008 | Vedantham et al. | 370/474 |
| 2009/0067328 A1 | 3/2009 | Morris et al. | |
| 2009/0086634 A1 | 4/2009 | Kwan et al. | |
| 2009/0089825 A1 * | 4/2009 | Coldwell | H04N 21/64322 725/25 |
| 2009/0213871 A1 | 8/2009 | Carlson et al. | |
| 2009/0222851 A1 * | 9/2009 | Talmi | H04N 7/17336 725/32 |
| 2009/0287405 A1 | 11/2009 | Liu et al. | |
| 2010/0014423 A1 | 1/2010 | Furuskar et al. | |
| 2010/0085923 A1 | 4/2010 | Nyberg et al. | |
| 2011/0016213 A1 | 1/2011 | Nakao | |
| 2011/0122887 A1 | 5/2011 | Ma et al. | |
| 2011/0134746 A1 | 6/2011 | Liu et al. | |
| 2011/0161261 A1 | 6/2011 | Wu et al. | |
| 2011/0194538 A1 | 8/2011 | Zheng et al. | |
| 2011/0305451 A1 | 12/2011 | Nishitani et al. | |
| 2011/0306351 A1 | 12/2011 | Pettersson et al. | |
| 2012/0039169 A1 | 2/2012 | Susitaival et al. | |
| 2012/0057478 A1 | 3/2012 | Brannstrom et al. | |
| 2012/0063377 A1 | 3/2012 | Osterling et al. | |
| 2012/0064908 A1 | 3/2012 | Fox et al. | |
| 2012/0099430 A1 | 4/2012 | Vos et al. | |
| 2012/0116863 A1 | 5/2012 | Boss et al. | |
| 2012/0203822 A1 * | 8/2012 | Floyd et al. | 709/203 |
| 2012/0330710 A1 | 12/2012 | Hauser et al. | |
| 2013/0016675 A1 | 1/2013 | Cha et al. | |
| 2013/0051359 A1 | 2/2013 | Skarby | |
| 2013/0121147 A1 | 5/2013 | Tapia et al. | |
| 2013/0166773 A1 | 6/2013 | Armstrong et al. | |
| 2013/0201996 A1 | 8/2013 | Masputra et al. | |
| 2014/0146666 A1 | 5/2014 | Kwan et al. | |
| 2014/0173025 A1 | 6/2014 | Killick | |
| 2014/0180575 A1 | 6/2014 | Lin | |
| 2014/0269962 A1 | 9/2014 | Gao et al. | |

* cited by examiner

RESOURCE MEASUREMENT AND MANAGEMENT

BACKGROUND

The transmission and distribution of data and content over networks has evolved over the years. Users expect a network, service, or content provider to be able to deliver data and content in various formats and at various times.

For particular system configurations and associated resources (e.g., bandwidth), dedicating resources to particular users may be expensive and burdensome. For example, in the context of an interactive environment (e.g., an interactive program guide (IPG)), offering users an ability to interact with content may deplete resources (e.g., bandwidth). The reduction or depletion of resources may have a noticeable impact or effect. For example, services might not be available as a result of the reduction in resources.

In the context of contention based protocols, frames of data may be sent by a transmitter when a frame becomes available. A frame may be resent until a receiver successfully receives it. As a network becomes more complicated (e.g., Ethernet systems with multiple sources and destinations) and/or communication volume increases, data frames may collide at a greater rate. An increase in collisions may result in a reduction or degradation in terms of efficiency.

Increasing the total amount of bandwidth available is expensive, as maintenance costs, management costs, and network complexity tend to increase with the increase in bandwidth, and resources may tend to be underutilized (on average) in such a configuration. Reducing the amount of bandwidth consumed by a given application may be undesirable, as an author or an operator of a given network or service may strive to provide content-rich applications.

SUMMARY

This summary is not intended to identify critical or essential features of the disclosure provided herein, but instead merely summarizes certain features and variations thereof.

In some illustrative embodiments, a monitor may be used to observe traffic or data flow in one or more networks. In some embodiments, the monitor may comprise one or more sniffers. In some embodiments, the monitor may observe the traffic in real-time or substantially real-time. In some embodiments, the monitor may observe traffic in an upstream direction, a downstream direction, or in both upstream and downstream directions.

In some embodiments, the monitor may be positioned at one or more locations. For example, the monitor may be positioned at an interface between one or more networks (e.g., at an interface between a radio frequency (RF) network and an internet protocol (IP) network). In some embodiments, the monitor may be positioned within one or more networks (e.g., within an RF network). In some embodiments, the monitor may be positioned in, or located within, one or more devices. In some embodiments, the monitor may be positioned to receive results (e.g., traffic results) from one or more devices (e.g., one or more servers, such as one or more application servers). The monitor may analyze the received results and provide commands or directives to the one or more devices based at least in part on the analysis.

In some embodiments, the monitor may be used to manage or shape traffic in one or more networks. For example, in some embodiments the monitor may transmit or issue commands or directives to control the rate of traffic or data flow in the one or more networks.

Other details and features will also be described in the sections that follow.

BRIEF DESCRIPTION OF THE DRAWINGS

The present disclosure is pointed out with particularity in the appended claims. Features of the disclosure will become more apparent upon a review of this disclosure in its entirety, including the drawing figures provided herewith.

Some features herein are illustrated by way of example, and not by way of limitation, in the figures of the accompanying drawings and in which like reference numerals refer to similar elements.

DETAILED DESCRIPTION

Various connections and/or communication links between elements are discussed in the following description. These connections and/or links are general and, unless specified otherwise, may be direct or indirect, wired or wireless, and this specification is not intended to be limiting in this respect.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized and structural and functional modifications may be made, without departing from the scope of the present disclosure.

Figure 1:
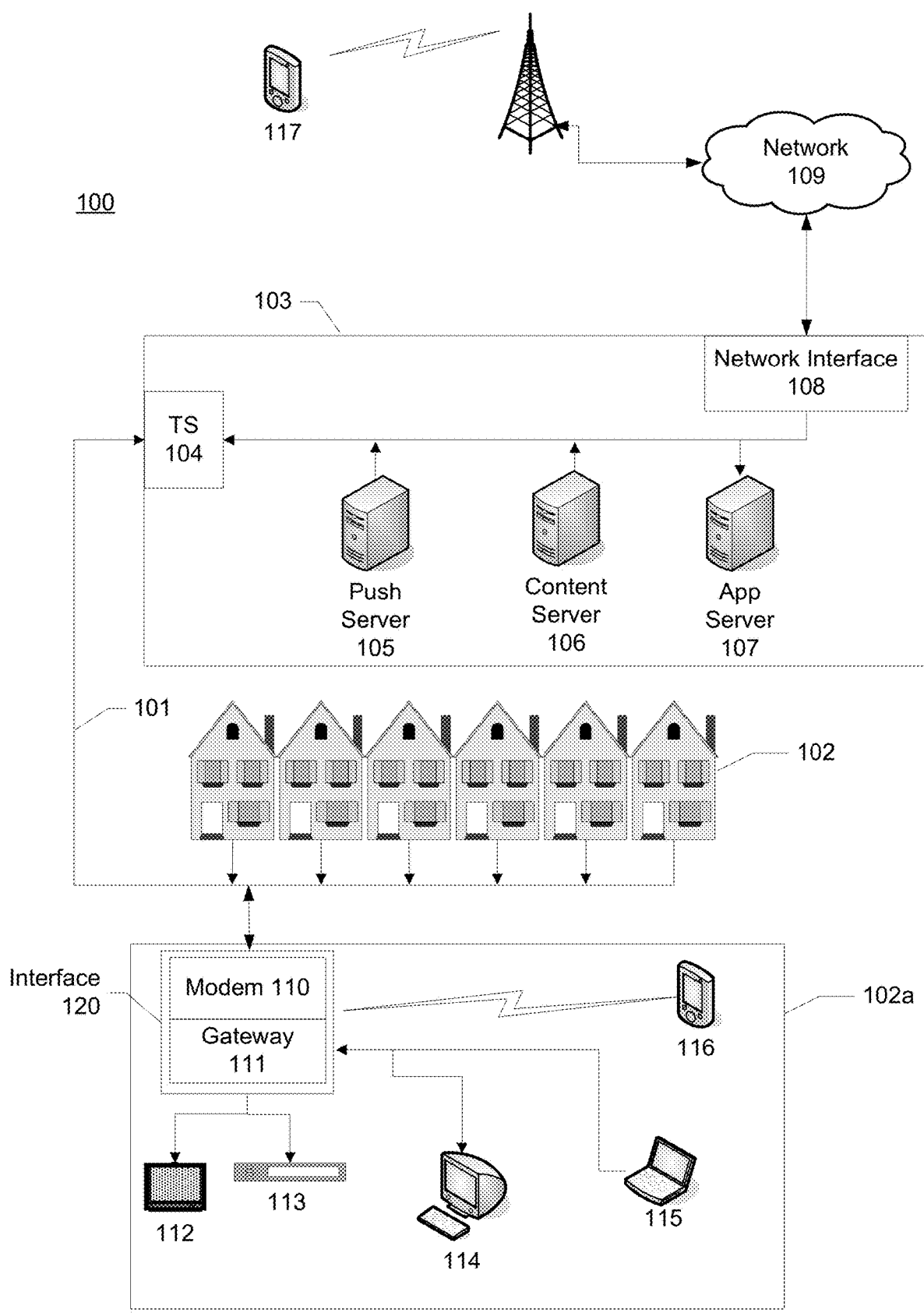
FIG. 1 illustrates an exemplary information distribution network.

FIG. 1 illustrates an example information distribution network 100 on which many of the various features described herein may be implemented. Network 100 may be any type of information distribution network, such as satellite, telephone, cellular, wireless, etc. One example may be an optical fiber network, a coaxial cable network or a hybrid fiber/coax distribution network. Such networks 100 use a series of interconnected communication lines 101 (e.g., coaxial cables, optical fibers, wireless, etc.) to connect multiple premises 102 (e.g., businesses, homes, consumer dwellings, etc.) to a central office or headend 103. The central office 103 may transmit downstream information signals onto the lines 101, and each premises 102 may have a receiver used to receive and process those signals.

There may be one line 101 originating from the central office 103, and it may be split a number of times to distribute the signal to various premises 102 in the vicinity (which may be many miles) of the central office 103. The lines 101 may include components not illustrated, such as splitters, filters, amplifiers, etc. to help convey the signal clearly, but in general each split introduces a bit of signal degradation. Portions of the lines 101 may also be implemented with fiber-optic cable, while other portions may be implemented with coaxial cable, other lines, or wireless communication paths. By running fiber optic cable along some portions, for example, signal degradation in those portions may be significantly minimized, allowing a single central office 103 to reach even farther with its network of lines 101 than before.

The central office 103 may include a modem termination system (TS) 104, such as a cable modem termination system (CMTS), which may be a computing device configured to manage communications between devices on the network of lines 101 and backend devices such as servers 105-107 (to be discussed further below). The termination system (TS) may be as specified in a standard, such as the Data Over Cable Service Interface Specification (DOCSIS) standard, published by Cable Television Laboratories, Inc. (a.k.a. CableLabs), or it may be a similar or modified device instead. The termination system (TS) may be configured to place data on one or more downstream frequencies to be received by modems at the various premises 102, and to receive upstream communications from those modems on one or more upstream frequencies. The central office 103 may also include one or more network interfaces 108, which can permit the central office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the interface 108 may include the corresponding circuitry needed to communicate on the network 109, and to other devices on the network such as a cellular telephone network and its corresponding cell phones.

As noted above, the central office 103 may include a variety of servers 105-107 that may be configured to perform various functions. For example, the central office 103 may include a push notification server 105. The push notification server 105 may generate push notifications to deliver data and/or commands to the various premises 102 in the network (or more specifically, to the devices in the premises 102 that are configured to detect such notifications). The central office 103 may also include a content server 106. The content server 106 may be one or more computing devices that are configured to provide content to users in the homes. This content may be, for example, video on demand movies, television programs, songs, text listings, etc. The content server 106 may include software to validate user identities and entitlements, locate and retrieve requested content, encrypt the content, and initiate delivery (e.g., streaming) of the content to the requesting user and/or device.

The central office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide or interactive program guide listings. Another application server may be responsible for monitoring user viewing habits and collecting that information for use in selecting advertisements. Another application server may be responsible for formatting and inserting advertisements in a video stream being transmitted to the premises 102. Another application server may be responsible for receiving user remote control commands, and processing them to provide an intelligent remote control experience.

An exemplary premises equipment may include an interface 120. The interface 120 may, in one aspect, comprise a modem 110, which may include transmitters and receivers used to communicate on the lines 101 and with the central office 103. The modem 110 may be, for example, a coaxial cable modem (for coaxial cable lines 101), a fiber interface node (for fiber optic lines 101), or any other modem device. The modem 110 may be connected to, or be a part of, a gateway interface device 111. The gateway interface device 111 may be a computing device that communicates with the modem 110 to allow one or more other devices in the premises to communicate with the central office 103 and other devices beyond the central office. The gateway 111 may comprise a terminal such as a set-top box (STB), digital video recorder (DVR), computer server, or any other desired computing device. The gateway 111 may also include (not shown) local network interfaces to provide communication signals to devices in the home, such as televisions 112, additional STBs 113, personal computers 114, laptop computers 115, wireless devices 116 (wireless laptops and netbooks, mobile phones, mobile televisions, personal digital assistants (PDA), etc.), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11), Bluetooth interfaces, and others.

In some embodiments, communications between the various components and devices shown in FIG. 1 may occur. For example, communications may occur in a downstream direction, an upstream direction, or in both downstream and upstream directions (e.g., via lines 101). In some embodiments, the communications may be based at least in part on contention-based protocols, such as ALOHA communications.

Figure 2:
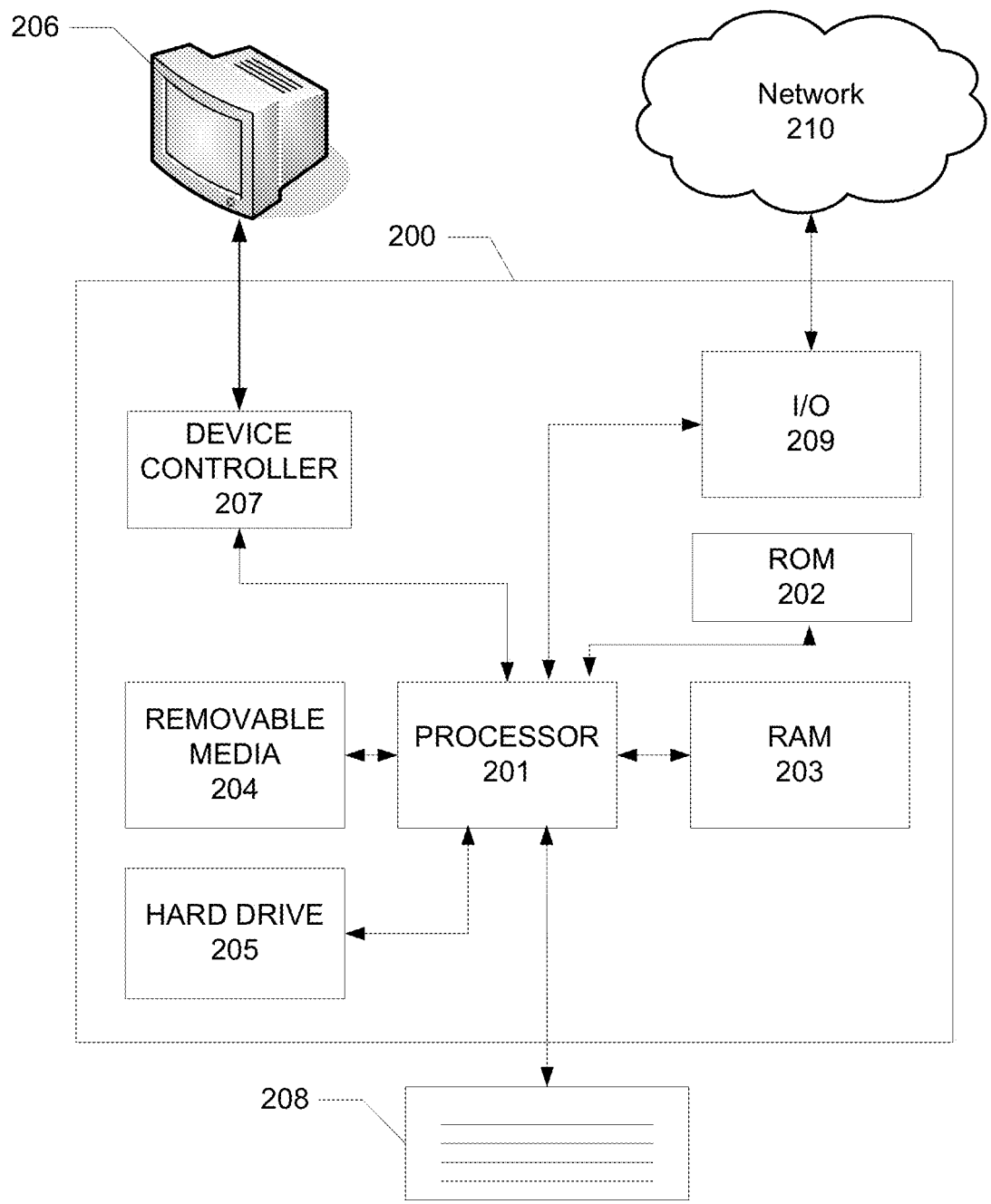
FIG. 2 illustrates an exemplary hardware platform on which various elements described herein can be implemented.

FIG. 2 illustrates general hardware elements that can be used to implement any of the various computing devices discussed above. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), or any other desired electronic storage medium. Instructions may also be stored in an attached (or internal) hard drive 205. The computing device 200 may include one or more output devices, such as a display 206 (or an external television), and may include one or more output device controllers 207, such as a video processor. There may also be one or more user input devices 208, such as a remote control, keyboard, mouse, touch screen, microphone, etc. The computing device 200 may also include one or more network interfaces, such as input/output circuits 209 (such as a network card) to communicate with an external network 210. The network interface may be a wired interface, wireless interface, or a combination of the two. In some embodiments, the interface 209 may include a modem (e.g., a cable modem), and network 210 may include the communication lines 101 discussed above, the external network 109, an in-home network, a provider's wireless, coaxial, fiber, or hybrid fiber/coaxial distribution system (e.g., a DOCSIS network), or any other desired network.

Certain aspects of this disclosure may be implemented in connection with one or more wired or wireless networks.

Aspects of this disclosure may be applied in connection with data and communication networks and protocols.

In some embodiments, a contention-based protocol may be used. For example, multiple transmitters may transmit on a given channel or frequency. A transmitter may determine whether there is energy present in the channel or frequency, and if so, the transmitter may wait for the energy to dissipate. Once the transmitter determines that there is no energy present in the channel, it may begin transmitting data. During the transmission, the transmitter may continue observing or listening to the channel or frequency to determine if a collision or contention occurs. If a collision or contention occurs, the transmitter may engage in a back-off period (which may be a random value in some embodiments) and retransmit the data upon the expiration of the back-off period.

In some embodiments, ALOHA communications or slotted ALOHA may be used. Slotted ALOHA subdivides the channel or frequency associated with standard ALOHA into multiple time slots. One or more transmitters may be assigned to particular time slots, thereby reducing the pool of transmitters that may potentially vie for the channel at a given point in time. As a result, the probability of collisions or contention using slotted ALOHA may be less than that experienced using standard ALOHA.

In theory, a particular network may operate at a maximum capacity of approximately 18%, for example, operating under an assumption of a distribution (e.g., a Poisson distribution) of messages being generated and sent in the network. Practical considerations may dictate that such a distribution is not actually present. For example, in the context of an interactive environment, there may be a spike or increase in the number of messages transmitted at various points in time. For example, in the context of an interactive program guide (IPG), if an advertisement is presented that invites users to select the advertisement (or a button or other selection mechanism associated therewith) to purchase a product or service (or engage in some other activity, such as providing enrollment information to receive more information on the product or service, or a discount regarding the same), there may be a large or significant increase in the number of messages (e.g., upstream messages) that are transmitted in the network over the period of time (or a portion thereof) that the advertisement is enabled for selection by users.

If not addressed, the periods of time in which a large number of messages are generated and sent in the network may have an impact on the performance of the network. If the number of users selecting the advertisement exceeds a threshold associated with upstream transmission resources (e.g., resources associated with communications in a direction from client devices towards a provider's device (e.g., a server)), then the indication of the particular user's selection of the advertisement to the provider's device may be significantly delayed (e.g., beyond a threshold representative of a tolerable delay). Similarly, resources associated with downstream communications (e.g., resources associated with communications in a direction from a provider's device towards one or more client or user devices) may be overwhelmed or exhausted, e.g., in response to the large number of users selecting the advertisement within a relatively short period of time. If not addressed, the consumption of resources may result in a service being unavailable or operating in a degraded state, which may in turn result in user dissatisfaction.

In some embodiments, a monitor may be used to monitor and manage resource consumption. In some embodiments, the monitor may observe traffic, messages, or data flow in real-time. In some embodiments, the monitor may observe traffic in an upstream and/or a downstream direction. In some embodiments, the monitor may comprise one or more sniffers. In some embodiments, the monitor may communicate with a network coordinator to control (e.g., throttle back) traffic.

Figure 3:
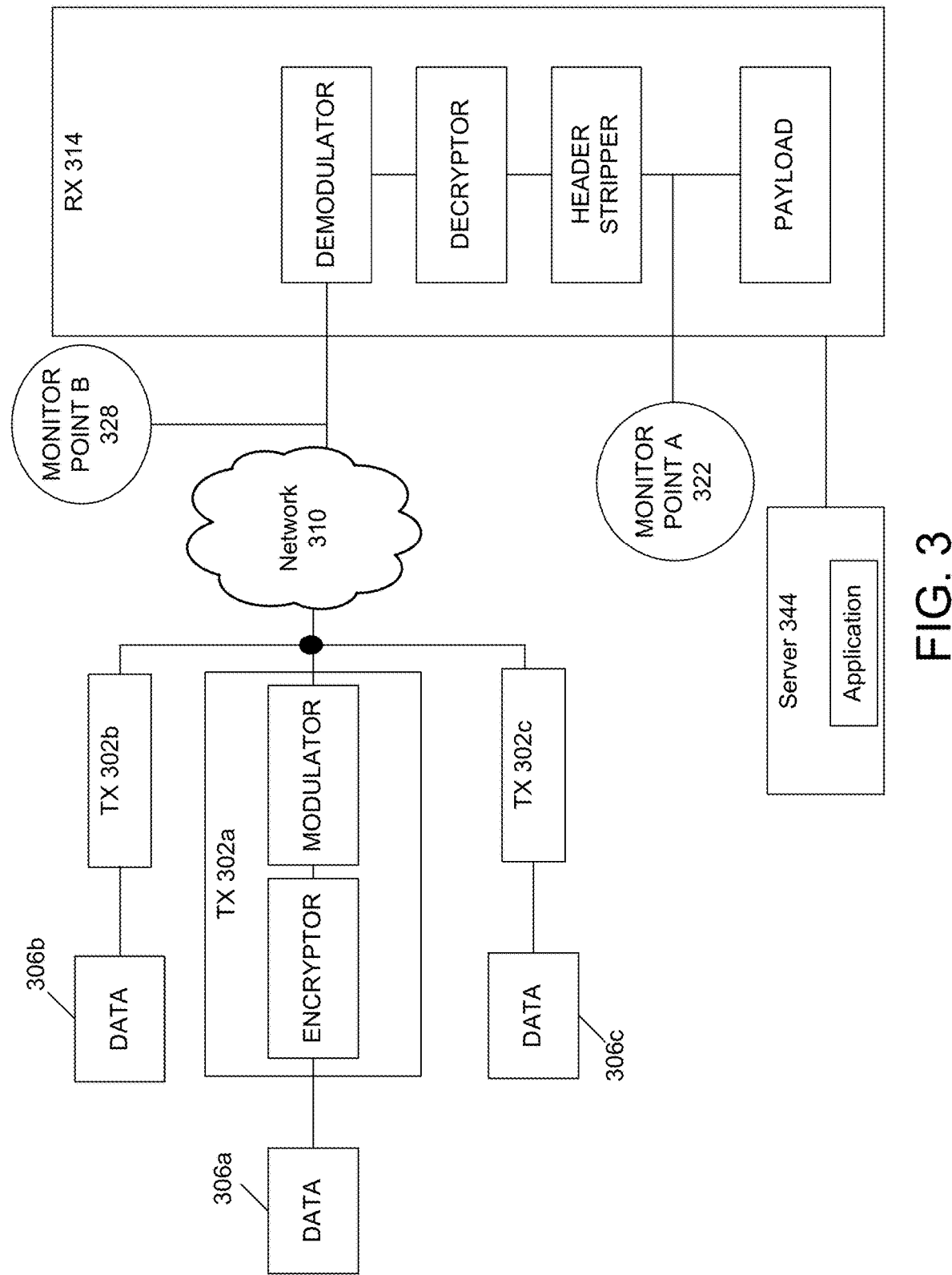
FIGS. 3-4 illustrate environments for measuring and monitoring traffic in which one or more aspects of this disclosure may be implemented.

FIG. 3 illustrates, in block diagram form, an architecture that may be used to implement one or more aspects of this disclosure. In some embodiments, the entities shown in FIG. 3 may be included in, or associated with, one or more of the entities described above in connection with FIGS. 1-2.

As shown in FIG. 3, a number of transmitters (TXs) 302a-302c may transmit data (e.g., data 306a-306c, respectively) to a receiver (RX) 314 via one or more networks 310. One or more of TXs 302 may be included in one or more content creator devices, content provider devices, client or user devices or terminals, such as a set-top box, a mobile phone, a smart phone, a remote control, a display device, a computer, etc. One or more of TXs 302 may be associated with a service group. RX 314 may be included in one or more devices, such as a server. The data transmission from one or more of TXs 302 to RX 314 may occur in an upstream direction.

In some embodiments, the data 306 to be transmitted from a TX 302 to RX 314 may take place at a radio frequency (RF). The data may include a payload, such as an internet protocol (IP) payload. The data may be modulated (e.g., via the modulator shown in FIG. 3) in accordance with one or more schemes or techniques. For example, quadrature phase shift keyed (QPSK) modulation may be used in some embodiments. In some embodiments, the data may be encrypted (e.g., via the encryptor shown in FIG. 3) using one or more encryption schemes or techniques.

RX 314 may be configured to receive one or more signals at one or more frequencies. If the signal is subject to modulation or encryption, RX 314 may demodulate (e.g., via the demodulator shown in FIG. 3) or decrypt (e.g., via the decryptor shown in FIG. 3) the received signal, as appropriate. In some embodiments, RX 314 may strip off a header (e.g., via the header stripper function shown in FIG. 3), such as an Asynchronous Transfer Mode (ATM) header, to obtain the payload. A measurement of traffic (e.g., network traffic) may be based on the payload, such as an observation of the payload, in some embodiments.

A monitor may be established at point A 322 to measure and monitor the traffic (e.g., the number of messages) being sent by the TXs 302. If the measured traffic at point A 322 indicates that the traffic exceeds a threshold amount, the monitor (or some other device associated with the monitor) may signal an entity responsible for the application that generated the traffic to throttle or reduce the traffic. For example, if RX 314 is associated with (e.g., included in) a server 344 that is responsible for providing an application, and the messages transmitted by TXs 302 are generated in response to that application, the monitor may signal the server 344 to throttle or reduce the traffic. Exemplary techniques for throttling or reducing traffic are described below.

If the application in question relates to an advertisement, and the data 306 comprises messages that indicate user selections of the advertisement, if the monitor at point A 322 indicates the number of messages in response to the advertisement exceeds a threshold amount, the monitor may command or direct a device, such as a server or any other device upstream from the TXs 302 responsible for the content of the advertisement, to reduce or throttle the activity associated with the advertisement. In some embodiments, the threshold amount may be a function of an application in question, network capacity (such as total network capacity), etc. The command or directive may specify the action to be taken by the device to reduce or throttle the activity associated with the advertisement. Alternatively, or additionally, the command or directive may leave it up to the device responsible for the content of the advertisement to determine one or more actions to take (if any) in order to reduce or throttle the activity associated with the advertisement.

The device responsible for the tracking and/or content of the advertisement (e.g., a server) may take any number of actions in response to the command/directive received from the monitor. For example, the device may disable the application, such that users are no longer presented with an option to select the advertisement. Alternatively, or additionally, the device may stagger the application, such as by limiting the number of client devices that receive the application, e.g., (only) a subset of client devices within a service group may receive the application. The staggering may be based on time, e.g., the application may be active for only a subset of time at a first client device relative to the length of the advertisement, and the time that the application is active at the first client device may be different from the time that the application is active at a second client device. In some embodiments, the device (e.g., the server) may impose a restriction on the number of users that are able to respond to, or interact with, the application, which may result in a reduction of traffic, e.g., upstream traffic.

The input or stimulus that is responsible for generating the messages (e.g., the interactive application associated with the advertisement) may be reduced or scaled back, which may result in a corresponding reduction or throttling of the messages from TXs 302 to RX 314. More generally, a reduction or throttling of the stimulus provided to client devices in the downstream direction may result in a reduction or throttling of traffic originating from the client devices in the upstream direction. In some embodiments, traffic may be monitored in an upstream direction, and responsive to determining that the monitored upstream traffic exceeds one or more thresholds, a controlling or throttling of traffic in a downstream direction may occur. In some embodiments, downstream data traffic may comprise portions that may require corresponding data traffic in the upstream direction.

In addition to, or as an alternative to, monitoring at point A 322, the monitor may be located at point B 328. For example, the monitor at point B 328 may monitor within a network, such as an RF network. The monitor may comprise a radio and may listen for on-going traffic (e.g., messaging). Locating the monitor at point B 328 may be used to determine network congestion based upon actual collisions. A more granular view of the network traffic may be obtained via a monitor located at point B 328 relative to the view obtained via a monitor located at point A 322. Furthermore, locating a monitor at point B 328 may enable a throttling of traffic at the instant collisions start to occur, or at some other point in time that may be correlated to, or associated with, a threshold value.

In some embodiments, the monitor may be located at a point different from (or in addition to) one or both of points A 322 and B 328 shown in FIG. 3. For example, in FIG. 4, four receivers (RXs) 314a-314d are shown. In some embodiments, more or fewer than four RXs may be included. One or more of RXs 314a-314d may be associated with one or more applications. One or more of receivers (RXs) 314a-314d may include devices similar to those shown in RX 314 of FIG. 3.

Figure 4:
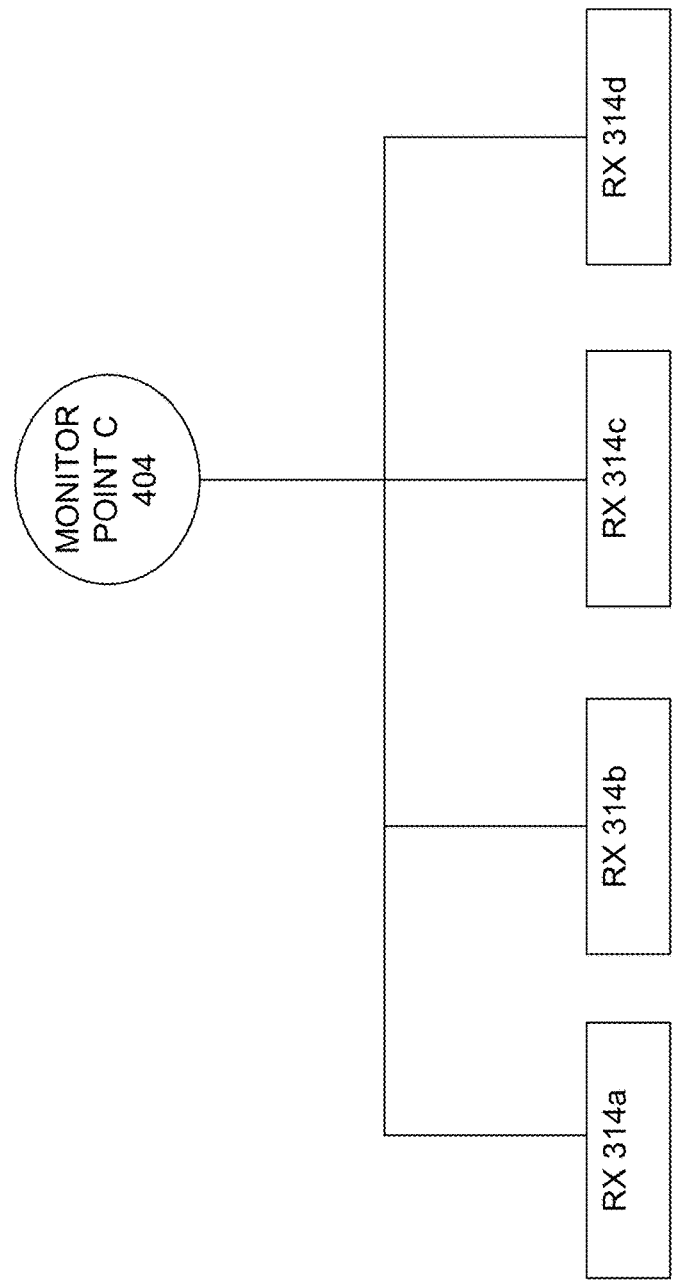

Also shown in FIG. 4 is a monitor located at point C 404. When a monitor is located at point C 404, the monitor may aggregate traffic measurements from the RXs 314a-314d and may take one or more actions similar to those described above in connection with a monitor located at points A 322 and B328 shown in FIG. 3. In this manner, the architecture of FIG. 4 may facilitate resource management across a plurality of applications for a given network or set of networks.

Figure 5:
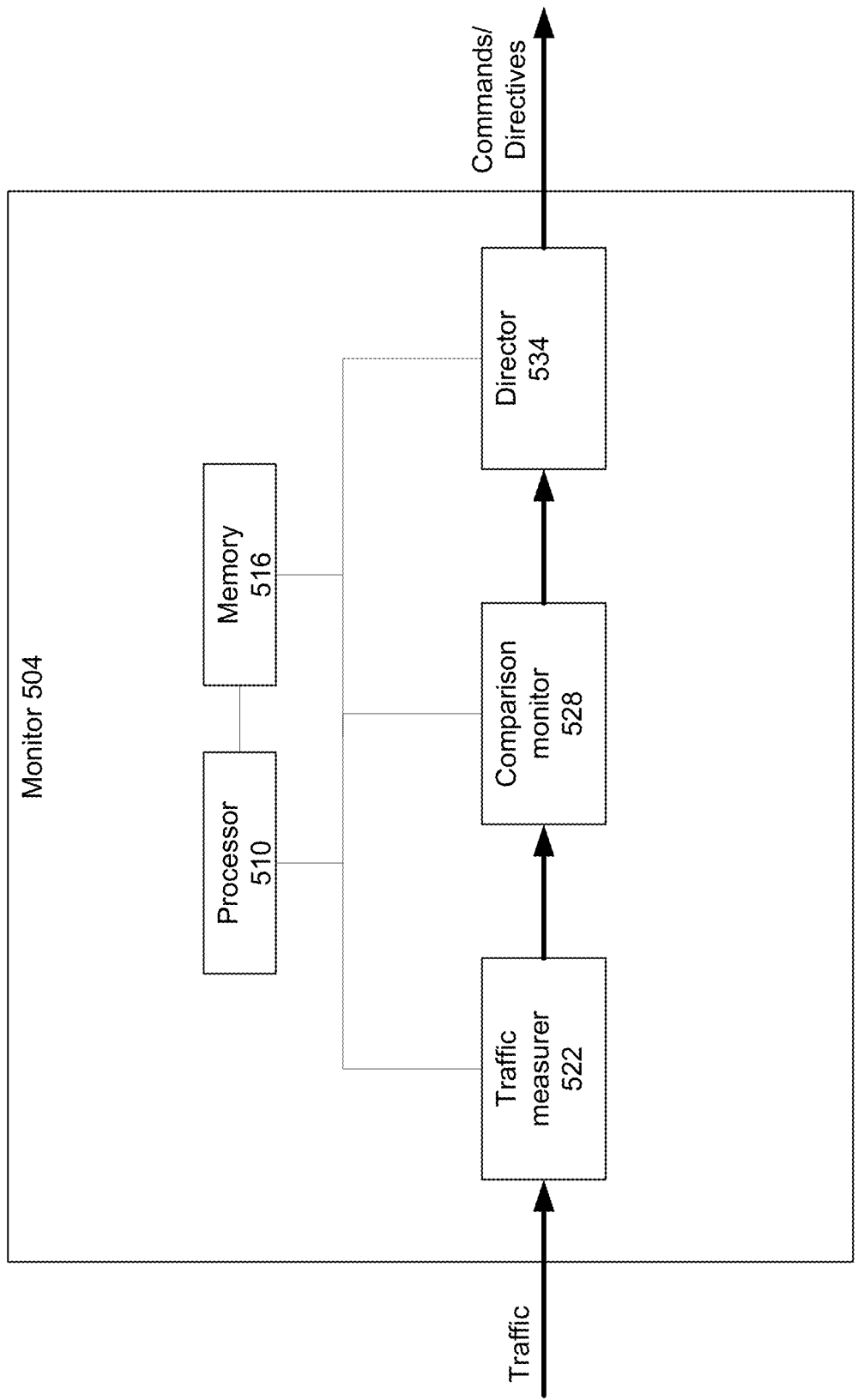
FIG. 5 illustrates an exemplary monitor in accordance with one or more aspects of this disclosure.

FIG. 5 illustrates a monitor 504 in accordance with one or more aspects of this disclosure. In some embodiments, monitor 504 may be located at one or more of points 322, 328, and 404 described above in connection with FIGS. 3-4.

Monitor 504 may comprise a processor 510 (e.g., processor 201 of FIG. 2) and a memory 516 (e.g., ROM 202 of FIG. 2). Memory 516 may store instructions that, when executed by processor 510, cause monitor 504 (or components or devices included in monitor 504) to perform one or more acts or processes.

Monitor 504 may comprise a traffic measurer 522. Traffic measurer 522 may receive as input traffic (e.g., data or messages) that appear on a communication channel or medium (e.g., lines 101 of FIG. 1). Traffic measurer 522 may store the input traffic. Traffic measurer 522 may store statistics regarding the input traffic, such as an identification of a source(s) or destination(s) of the traffic, the volume of traffic (e.g., a number of messages received per unit time), etc.

Monitor 504 may comprise a comparison monitor 528. Comparison monitor 528 may compare the traffic measured by traffic measurer 522, or other characteristics, against one or more thresholds. The one or more thresholds may be stored in memory 516 and may be retrieved by, or accessed at, comparison monitor 528.

Comparison monitor 528, which may comprise hardware, firmware, and/or software, may provide an indication of the comparison of the measured traffic to the one or more thresholds to a hardware, firmware, and/or software device, such as a director 534. Director 534 may issue one or more commands or directives in response to the indication from comparison monitor 528. For example, if the indication provided by comparison monitor 528 indicates that the measured traffic exceeds one or more thresholds, director 534 may issue a command or directive that causes a throttling or reduction of the traffic in accordance with the techniques described herein.

In some embodiments, a monitor (e.g., monitor 504) may have established rules related to classes of services. Certain types of traffic may be prioritized over others. For example, messaging related to specific services such as Video On Demand (VOD) may have a priority level assigned which is higher than that of an advertising-based service.

In some embodiments, certain forms of messaging interaction may be known as "short" while others may be known as "long" form interaction. "Short" messaging may include a limited set of interactions associated with an exchange, and long may be related to a more interactive session. An example of these might be the contrast between a Caller ID notification and an Interactive Gaming Session. The Caller ID notification might be classified as "short" and the Interactive Gaming Session might be classified as "long". In some embodiments, a classification may be used to determine whether to request, e.g., an application server to throttle messaging ahead of the actual load on the network being realized.

In some embodiments, a taxonomy may be created for the classification of data networking exchanges used in a network (e.g., a cable network). In some embodiments, one or more upstream/downstream message exchanges may be classified according to type. In some embodiments, rules associated with a type and/or provisioned prioritizations may be applied. The applied rules may result in a throttling of lower priority or more highly interactive sessions.

The architectures and hardware/firmware/software environments described above are illustrative. One or more of the entities shown might not be included in some embodiments. For example, in some embodiments, additional entities not shown in FIGS. 1-5 may be included. In some embodiments, the entities may be arranged in a manner different from what is described.

Figure 6:
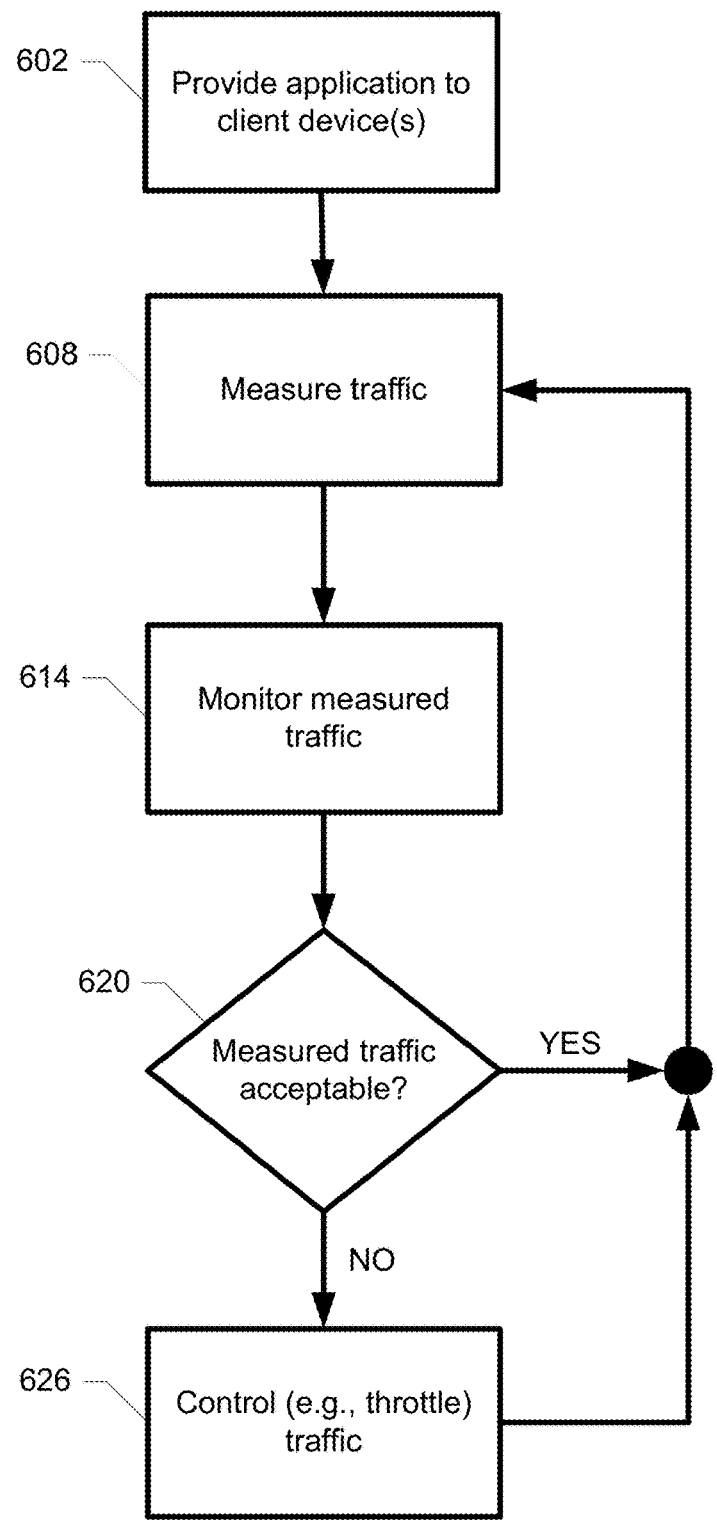
FIG. 6 illustrates a method for demonstrating one or more aspects of this disclosure.

FIG. 6 provides an example method including steps that may implement one or more aspects of this disclosure. The method may be operative in one or more environments, and on one or more devices or entities, such as the environments and devices described above in connection with FIGS. 1-5.

As shown in FIG. 6, in step 602 an application or piece of content may be provided to one or more user or client devices. The application may be associated with one or more content assets, such as a television program, an advertisement, an audio track, a text file, an email, an instant message, etc. For example, the application may provide for an interactive function or capability that is associated with the content asset(s). In some embodiments, the provided application may adhere to the Enhanced TV Binary Interchange Format (EBIF).

In step 608, traffic may be measured (e.g., by traffic measurer 522 of FIG. 5). The measured traffic may correspond to traffic generated by the one or more client devices in an upstream direction. The measured traffic may comprise data and/or messages, and may include or be generated based at least in part on the application provided in connection with step 602. For example, if the application provides an interactive selection mechanism associated with an advertisement, the traffic may signify or indicate user selections of the advertisement (or the mechanism associated therewith).

In step 614, the measured traffic may be monitored. For example, the measured traffic of step 608 may be compared (e.g., by comparison monitor 528 of FIG. 5) with one or more threshold values in step 614 to determine whether a resource (e.g., bandwidth) is being exploited in an efficient or preferential way. In some embodiments, the one or more threshold values may be determined by a network, service, or content provider. In some embodiments, the one or more threshold values may be configurable by one or more users. In some embodiments, the one or more threshold values may be adaptive over time, possibly in response to one or more events. For example, the threshold(s) may be lowered in response to recent application server failures in order to protect against additional failures.

In step 620, a determination may be made (e.g., by comparison monitor 528 of FIG. 5) whether the measured traffic is acceptable. For example, if the monitoring of step 614 indicates that the measured traffic does not exceed a threshold (e.g., the "YES" path is taken out of step 620), then operational flow may proceed back to step 608 to continue measuring the traffic. In this manner, a loop may be maintained so long as the measured traffic is acceptable (e.g., so long as the measured traffic is within threshold limits). If, on the other hand, the monitoring associated with step 614 indicates that the measured traffic exceeds a threshold (e.g., the "NO" path is taken out of step 620), then flow may proceed to step 626.

In step 626, one or more actions may be taken to control, for example, throttle, the traffic. In some embodiments, one or more commands or directives may be issued (e.g., by director 534 of FIG. 5) to throttle the traffic. In some embodiments, the throttling of the traffic may comprise throttling, reducing, or scaling back an input or stimulus in a downstream direction, which may result in a throttling of the measured traffic in, e.g., the upstream direction. For example, a message may be sent to a server responsible for providing an application to suspend sending data associated with the application to client devices. In some embodiments, a message may be sent to a client device to disable selection or interaction with the application at the client device. In some embodiments, an indication of the throttling back may be provided to one or more users. For example, in the context of an advertisement, a display screen may be generated that advises a user that the user's request (with respect to the advertisement) cannot be processed at this time.

In some embodiments, the throttling action may subside or expire. For example, the throttling action may expire after a predetermined amount of time has lapsed, in response to an event (e.g., upstream traffic falling below a threshold associated with step 620), etc. A user selection or interaction with an application during the time when traffic is throttled may be processed after the throttling action has expired. For example, a user device or a client device may store or buffer a user selection until a point in time is reached where the condition(s) that caused the throttling to take place have subsided.

The method described above in connection with FIG. 6 is illustrative. In some embodiments, some of the steps (or portions thereof) may be optional. In some embodiments, additional steps not shown may be included. In some embodiments, the order or sequence of the steps may be different from what is shown in FIG. 6.

Aspects of this disclosure may readily be applied to, and adapted to be operative on, one or more communication systems, including computer networks, television networks, satellite networks, telephone and cellular networks, and the like.

Although not required, functions described herein may be embodied as a method, a data processing system, and/or as a non-transitory computer-readable medium storing executable instructions. Aspects of the disclosure may take the form of an entirely hardware embodiment, an entirely software embodiment, an entirely firmware embodiment, or an embodiment combining software, firmware and hardware. The functionality may be resident in a single computing device, or may be distributed across multiple computing devices/platforms, the multiple computing devices/platforms optionally being connected to one another via one or more networks. Moreover, the structural components described herein may be distributed amongst one or more devices, optionally within a common housing or casing.

Although communications and contention based communication protocols have been discussed in the example embodiments, the disclosure relates to and encompasses other communication techniques and protocols. In some embodiments, one or more network, service, or content providers (or devices or equipment associated therewith) may be configured to provide data (e.g., content) using one or more transmission techniques, and may manage traffic generated in response to the data. Moreover, while aspects of the disclosure have been described in terms of applications and advertisements, aspects of the disclosure also include other forms and types of data (e.g., text, audio, computer programs, movies, programs/shows, caller identifications, etc.) delivered or distributed via one or more schemes or techniques (e.g., video on demand (VOD)).

In some embodiments, an active video network (AVN) may be used in connection with a browser, where a client device may be provided with a content-rich (e.g., graphic rich) navigation interface. Intelligence may reside in one or more network devices, and user selections may be conveyed from client devices to the one or more network devices to operate on the user selections. More generally, aspects of disclosure may be applied to any context, e.g., environments incorporating upstream communications.

The methodological acts and processes may be tied to particular machines or apparatuses. For example, as described herein, an application may distributed to a client or user device via one or more computing devices (e.g., servers) and that application may be rendered at the client device (e.g., at a display device associated with the client device). The application may support user interaction, and traffic generated in response to that user interaction may be measured and monitored in connection with a resource utilization. More generally, one or more computers may include one or more processors and memory storing instructions that, when executed, cause the one or more computers to perform the methodological acts and processes described herein. Furthermore, the methodological acts and processes described herein may perform a variety of functions including transforming an article (e.g., upstream traffic) into a different state or thing (e.g., throttled upstream traffic).

Aspects of the disclosure have been described in terms of illustrative embodiments thereof. While illustrative systems and methods as described herein embodying various aspects of the present disclosure are shown, it will be understood by those skilled in the art, that the disclosure is not limited to these embodiments. Modifications may be made by those skilled in the art, particularly in light of the foregoing teachings. For example, each of the features of the aforementioned illustrative examples may be utilized alone or in combination or subcombination with elements of the other examples. For example, any of the above described systems and methods or parts thereof may be combined with the other methods and systems or parts thereof described above in any order. It will also be appreciated and understood that modifications may be made without departing from the true spirit and scope of the present disclosure. The description is thus to be regarded as illustrative instead of restrictive on the present disclosure.

What is claimed is:

1. A method comprising:
    receiving, from one or more first computing devices, a plurality of responses to an initial portion of interactive content sent by one or more second computing devices, wherein the plurality of responses comprises indications of user selections associated with the initial portion of the interactive content; and
    sending, to the one or more second computing devices and based on determining that a rate at which the plurality of responses was received satisfies a threshold metric, a message that causes the one or more second computing devices to reduce a rate at which the one or more second computing devices send a further portion of the interactive content.

2. The method of claim 1, wherein the message causes the one or more second computing devices to stop sending the further portion of the interactive content for a period of time.

3. The method of claim 2, further comprising: determining a classification for the plurality of responses to the initial portion of the interactive content, and wherein determining that the rate at which the plurality of responses was received satisfies the threshold metric is based on the classification.

4. The method of claim 1, further comprising:
    receiving one or more radio frequency (RF) signals;
    demodulating the one or more RF signals to obtain the plurality of responses; and
    determining one or more payloads from the plurality of responses, wherein the rate at which the plurality of responses was received satisfies the threshold metric based on the one or more payloads.

5. The method of claim 1, wherein the initial portion of the interactive content comprises content for an interactive gaming session, wherein the plurality of responses comprises indications of user selections associated with the interactive gaming session.

6. The method of claim 1, wherein the method further comprises:
    after sending the message, receiving, from the one or more first computing devices, an additional plurality of responses to the further portion of the interactive content; and
    based on determining that an additional rate at which the additional plurality of responses was received does not satisfy an additional threshold metric, sending, to the one or more second computing devices, another message that causes the reduced rate of sending of the further portion of the interactive content to expire.

7. The method of claim 1, wherein the one or more first computing devices comprises a plurality of first computing devices, and wherein the message causes:
    reducing, by the one or more second computing devices, the rate at which the one or more second computing devices send the further portion of the interactive content to the plurality of first computing devices by at least:
        sending the further portion of the interactive content only to a first subset of the plurality of first computing devices during a first time period, and
        sending the further portion of the interactive content only to a second subset of the plurality of first computing devices during a second time period.

8. The method of claim 1, further comprising: based on determining that the rate at which the plurality of responses was received satisfies the threshold metric, presenting a selectable option to remove the further portion of the interactive content from the one or more first computing devices.

9. The method of claim 1, wherein the one or more first computing devices are located at a user location, wherein the one or more second computing devices are located at a service provider location, and wherein the method further comprises:
    monitoring, by one or more third computing devices that are located at the service provider location, a channel associated with an ALOHA communication or a frequency associated with the ALOHA communication, wherein the monitoring comprises the receiving of the plurality of responses.

10. The method of claim 1, wherein the interactive content comprises one of advertising content, an interactive program guide, a television program, an advertisement, an instant message, an e-mail, an audio track, or a text file.

11. The method of claim 1, wherein the plurality of responses comprise interactions with the interactive content.

12. The method of claim 1, further comprising:
sending, to the one or more first computing devices and based on determining that the rate at which the plurality of responses was received satisfies the threshold metric, data that causes the one or more first computing devices to remove an option enabling selection of the interactive content.

13. The method of claim 1, wherein the message further causes the one or more second computing devices to remove interactive features from the further portion of the interactive content.

14. The method of claim 1, wherein the message further causes the one or more second computing devices to adjust a frequency of interactive features in the further portion of the interactive content.

15. An apparatus comprising:
one or more processors; and
memory storing instructions that, when executed by the one or more processors, cause the apparatus to:
receive, from one or more first computing devices, a plurality of responses to an initial portion of interactive content sent by one or more second computing devices, wherein the plurality of responses comprises indications of user selections associated with the initial portion of the interactive content; and
send, to the one or more second computing devices and based on determining that a rate at which the plurality of responses was received satisfies a threshold metric, a message that causes the one or more second computing devices to reduce a rate at which the one or more second computing devices sends a further portion of the interactive content to the one or more first computing devices.

16. The apparatus of claim 15, wherein the instructions, when executed by the one or more processors, further cause the apparatus to:
after sending the message, receive, from the one or more first computing devices, an additional plurality of responses to the further portion of the interactive content; and
based on determining that an additional rate at which the additional plurality of responses was received does not satisfy an additional threshold metric, send, to the one or more second computing devices, another message that causes the reduced rate of sending of the further portion of the interactive content to expire.

17. The apparatus of claim 15, wherein the instructions, when executed by the one or more processors, further cause the apparatus to: send, to the one or more first computing devices and based on determining that the rate at which the plurality of responses was received satisfies the threshold metric, data that causes the one or more first computing devices to remove an option enabling selection of the interactive content.

18. The apparatus of claim 15, wherein the message causes the one or more second computing devices to stop sending the further portion of the interactive content for a period of time.

19. The apparatus of claim 15, wherein the instructions, when executed by the one or more processors, further cause the apparatus to:
determine a classification for the responses to the initial portion of the interactive content, and wherein determining that the rate at which the plurality of responses was received satisfies the threshold metric is based on the classification.

20. The apparatus of claim 15, wherein the instructions, when executed by the one or more processors, further cause the apparatus to:
receive one or more radio frequency (RF) signals;
demodulate the one or more RF signals to obtain the plurality of responses; and
determine one or more payloads from the plurality of responses, wherein determining that the rate at which the plurality of responses was received satisfies the threshold metric is based on the one or more payloads.

21. The apparatus of claim 15, wherein the initial portion of the interactive content comprises content for an interactive gaming session, wherein the plurality of responses comprises indications of user selections associated with the interactive gaming session.

22. The apparatus of claim 15, wherein the one or more first computing devices comprises a plurality of first computing devices, and wherein the message causes the one or more second computing devices to:
reduce the rate at which the one or more second computing devices send the further portion of the interactive content to the plurality of first computing devices by at least:
sending the further portion of the interactive content only to a first subset of the plurality of first computing devices during a first time period, and
sending the further portion of the interactive content only to a second subset of the plurality of first computing devices during a second time period.

23. The apparatus of claim 15, wherein the instructions, when executed by the one or more processors, further cause the apparatus to:
based on determining that the rate at which the plurality of responses was received satisfies the threshold metric, present a selectable option to remove the further portion of the interactive content from the one or more first computing devices.

24. The apparatus of claim 15, wherein the apparatus and the one or more second computing devices are located at a service provider location, wherein the one or more first computing devices are located at a user location, and wherein the instructions, when executed by the one or more processors, further cause the apparatus to:
monitor a channel, associated with an ALOHA communication or a frequency associated with the ALOHA communication, by receiving the plurality of responses.

25. The apparatus of claim 15, wherein the interactive content comprises one of advertising content, an interactive program guide, a television program, an advertisement, an instant message, an e-mail, an audio track, or a text file.

26. The apparatus of claim 15, wherein the responses comprise interactions with the interactive content.

27. The apparatus of claim 15, wherein the message further causes the one or more second computing devices to remove interactive features from the further portion of the interactive content.

28. The apparatus of claim 15, wherein the message further causes the one or more second computing devices to adjust a frequency of interactive features in the further portion of the interactive content.

29. A system comprising:
a first computing device comprising:
one or more first processors; and
memory storing first instructions that, when executed by the one or more first processors, cause the first computing device to:
send an initial portion of interactive content via a network; and a monitor device comprising:
one or more second processors; and
memory storing second instructions that, when executed by the one or more second processors, cause the monitor device to:
receive, from one or more second computing devices, a plurality of responses to the initial portion of the interactive content sent by the first computing device, wherein the plurality of responses comprises indications of user selections associated with the initial portion of the interactive content; and
send, to the first computing device and based on determining that a rate at which the plurality of responses was received satisfies a threshold metric, a message that causes the first computing device to reduce a rate at which the first computing device sends a further portion of the interactive content.

30. The system of claim 29, wherein the interactive content comprises one of advertising content, an interactive program guide, a television program, an advertisement, an instant message, an e-mail, an audio track, or a text file.

31. The system of claim 29, wherein the message causes the first computing device to stop sending the further portion of the interactive content for a period of time.

32. The system of claim 29, wherein the second instructions, when executed by the one or more second processors, further cause the monitor device to:
determine a classification for the responses to the initial portion of the interactive content, and wherein determining that the rate at which the plurality of responses was received satisfies the threshold metric is based on the classification.

33. The system of claim 29, wherein the second instructions, when executed by the one or more second processors, further cause the monitor device to:
receive one or more radio frequency (RF) signals;
demodulate the one or more RF signals to obtain the plurality of responses; and
determine one or more payloads from the plurality of responses, wherein determining that the rate at which the plurality of responses was received satisfies a threshold metric is based on the one or more payloads.

34. The system of claim 29, wherein the initial portion of the interactive content comprises content for an interactive gaming session, and wherein the plurality of responses comprises indications of user selections associated with the interactive gaming session.

35. The system of claim 29, wherein the second instructions, when executed by the one or more second processors, further cause the monitor device to:
after sending the message, receive, from the one or more second computing devices, an additional plurality of responses to the further portion of the interactive content; and
based on determining that an additional rate at which the additional plurality of responses was received does not satisfy an additional threshold metric, send, to the first computing device, another message that causes the reduced rate of sending of the further portion of the interactive content to expire.

36. The system of claim 29, wherein the one or more second computing devices are a plurality of second computing devices, and wherein the first instructions, when executed by the one or more first processors and based on receipt of the message from the monitor device, further cause the first computing device to:
reduce the rate at which the first computing device sends the further portion of the interactive content to the plurality of second computing devices by at least:
sending the further portion of the interactive content only to a first subset of the plurality of second computing devices during a first time period, and
sending the further portion of the interactive content only to a second subset of the plurality of second computing devices during a second time period.

37. The system of claim 29, wherein the second instructions, when executed by the one or more second processors, further cause the monitor device to:
based on determining that the rate at which the plurality of responses was received satisfies the threshold metric, present a selectable option to remove the further portion of the interactive content from the one or more second computing devices.

38. The system of claim 29, wherein first computing device and the monitor device are located at a service provider location, wherein the one or more second computing devices are located at a user location, and wherein the second instructions, when executed by the one or more second processors, further cause the monitor device to:
monitor a channel, associated with an ALOHA communication or a frequency associated with the ALOHA communication, by receiving the plurality of responses.

39. The system of claim 29, wherein the second instructions, when executed by the one or more second processors, further cause the monitor device to:
send, based on determining that the rate at which the plurality of responses was received satisfies the threshold metric, to the one or more second computing devices, data that causes the one or more second computing devices to remove an option enabling selection of the interactive content.

40. The system of claim 29, wherein the responses comprise interactions with the interactive content.

41. The system of claim 29, wherein the message further causes the first computing device to remove interactive features from the further portion of the interactive content.

42. The system of claim 29, wherein the message further causes the first computing device to adjust a frequency of interactive features in the further portion of the interactive content.

* * * * *